United States Patent
Ojima et al.

(10) Patent No.: US 10,003,094 B2
(45) Date of Patent: Jun. 19, 2018

(54) FUEL CELL SYSTEM AND METHOD OF CONTROLLING FUEL CELL SYSTEM

(71) Applicant: HONDA MOTOR CO., LTD., Tokyo (JP)

(72) Inventors: Kuniaki Ojima, Wako (JP); Takuya Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 15/379,483

(22) Filed: Dec. 15, 2016

(65) Prior Publication Data

US 2017/0237094 A1  Aug. 17, 2017

(30) Foreign Application Priority Data

Feb. 15, 2016  (JP) ................... 2016-025445

(51) Int. Cl.
| | |
|---|---|
| *H01M 8/04* | (2016.01) |
| *H01M 8/04746* | (2016.01) |
| *H01M 8/04228* | (2016.01) |
| *H01M 8/04007* | (2016.01) |
| *H01M 8/04082* | (2016.01) |
| *H01M 8/0432* | (2016.01) |
| *H01M 8/04223* | (2016.01) |
| *H01M 8/04701* | (2016.01) |

(52) U.S. Cl.
CPC ..... *H01M 8/04761* (2013.01); *H01M 8/0435* (2013.01); *H01M 8/04067* (2013.01); *H01M 8/04201* (2013.01); *H01M 8/04228* (2016.02); *H01M 8/04253* (2013.01); *H01M 8/04365* (2013.01); *H01M 8/04716* (2013.01); *H01M 2250/20* (2013.01); *Y02T 90/32* (2013.01)

(58) Field of Classification Search
CPC ......... H01M 8/04761; H01M 8/04228; H01M 8/04067; H01M 8/04201; H01M 8/04253; H01M 8/0435; H01M 8/04365; H01M 8/04716; H01M 2250/20; Y02T 90/32
See application file for complete search history.

(56) References Cited

U.S. PATENT DOCUMENTS

| | | | | |
|---|---|---|---|---|
| 7,354,673 B2* | 4/2008 | Fujita | ................ | H01M 8/04223 429/423 |
| 7,666,532 B2* | 2/2010 | Miyata | .............. | H01M 8/04007 429/429 |
| 8,420,272 B2* | 4/2013 | Ota | ................... | H01M 8/04955 429/428 |

FOREIGN PATENT DOCUMENTS

JP  2008-135285  6/2008

* cited by examiner

*Primary Examiner* — Renee S Luebke
*Assistant Examiner* — Paul Baillargeon
(74) *Attorney, Agent, or Firm* — Mori & Ward, LLP

(57) ABSTRACT

A fuel cell system includes a first temperature sensor to detect a valve temperature of a sealing valve. A second temperature sensor is provided in a refrigerant circulation circuit to detect a fuel cell temperature of a fuel cell through a refrigerant. The circuitry is configured to calculate a sealing valve estimated temperature by subtracting a correction value from the fuel cell temperature detected by the second temperature sensor after the fuel cell stops generating electric power and after the sealing valve is closed. The circuitry is configured to determine whether at least one of the valve temperature and the sealing valve estimated temperature is lower than a predicted freezing temperature. The circuitry is configured to open the sealing valve when it is determined that the at least one of the valve temperature and the sealing valve estimated temperature is lower than the predicted freezing temperature.

11 Claims, 10 Drawing Sheets

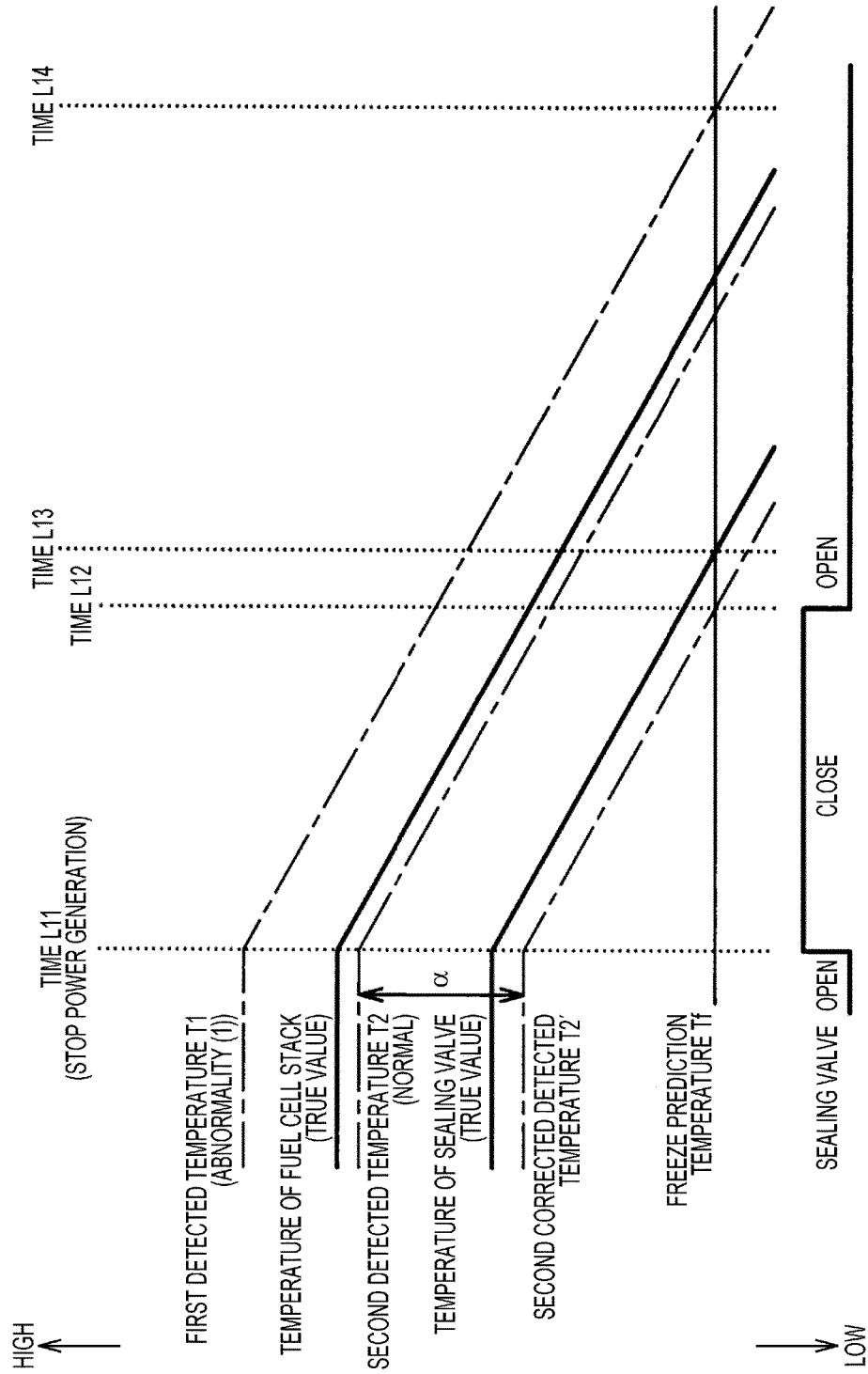

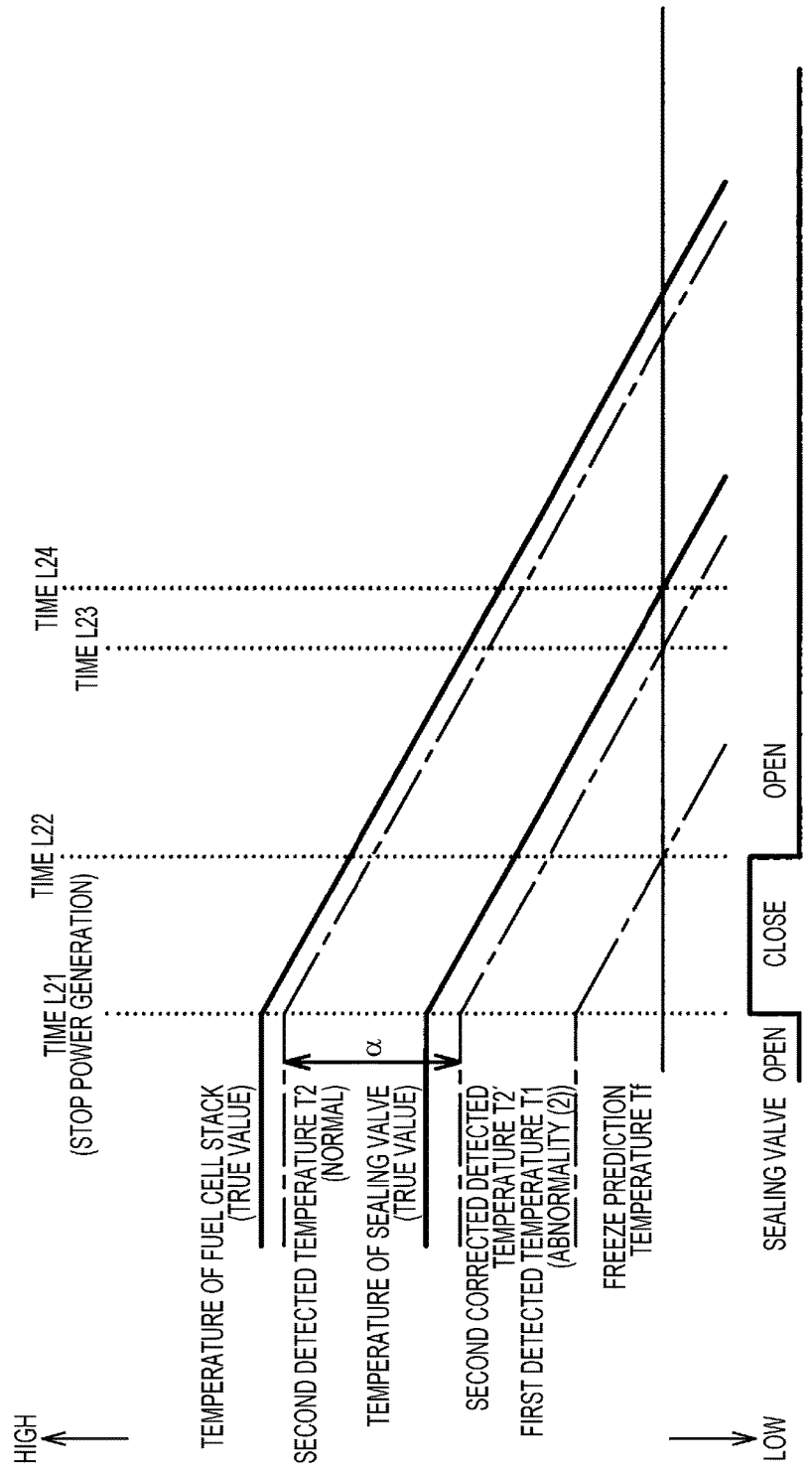

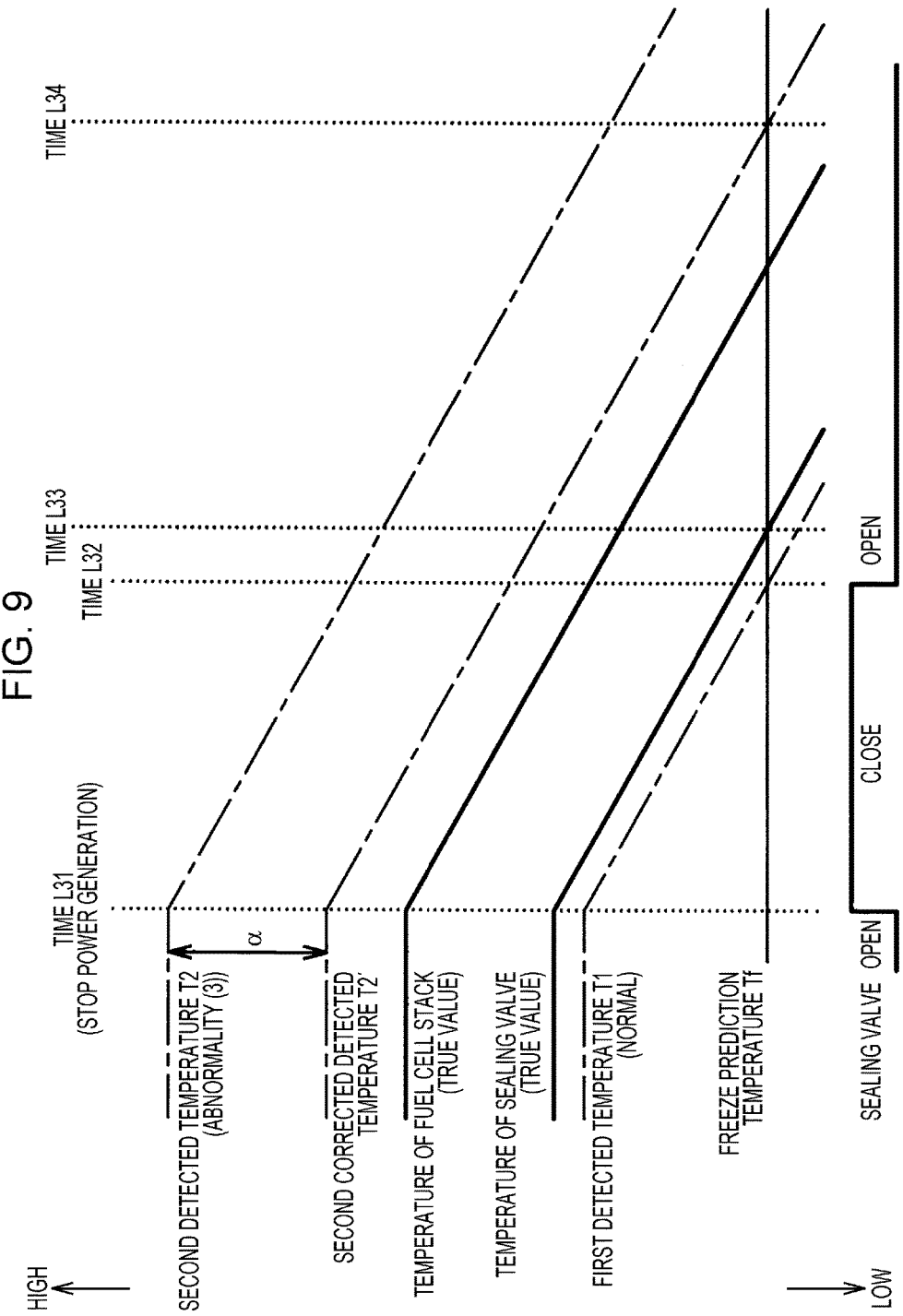

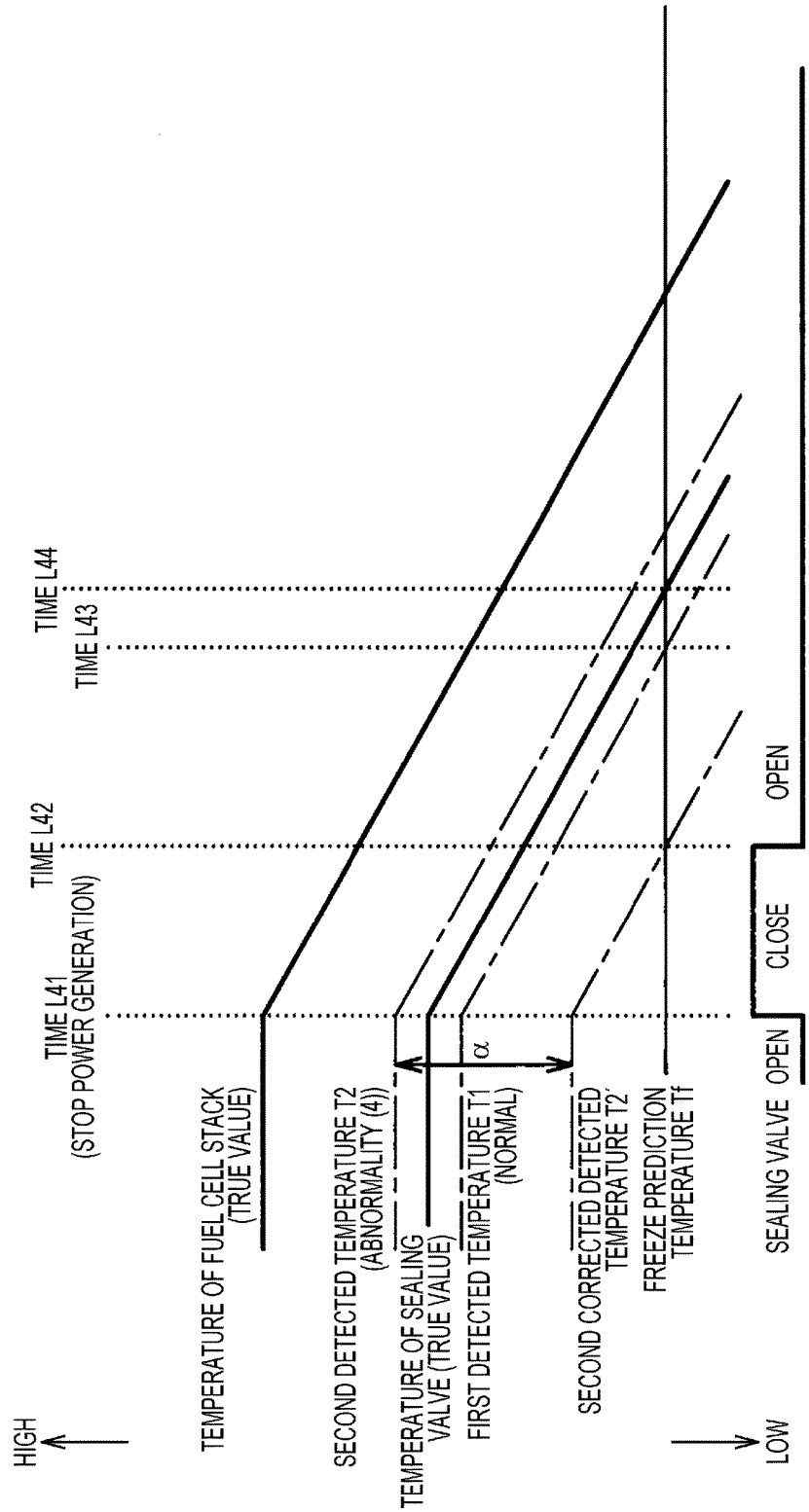

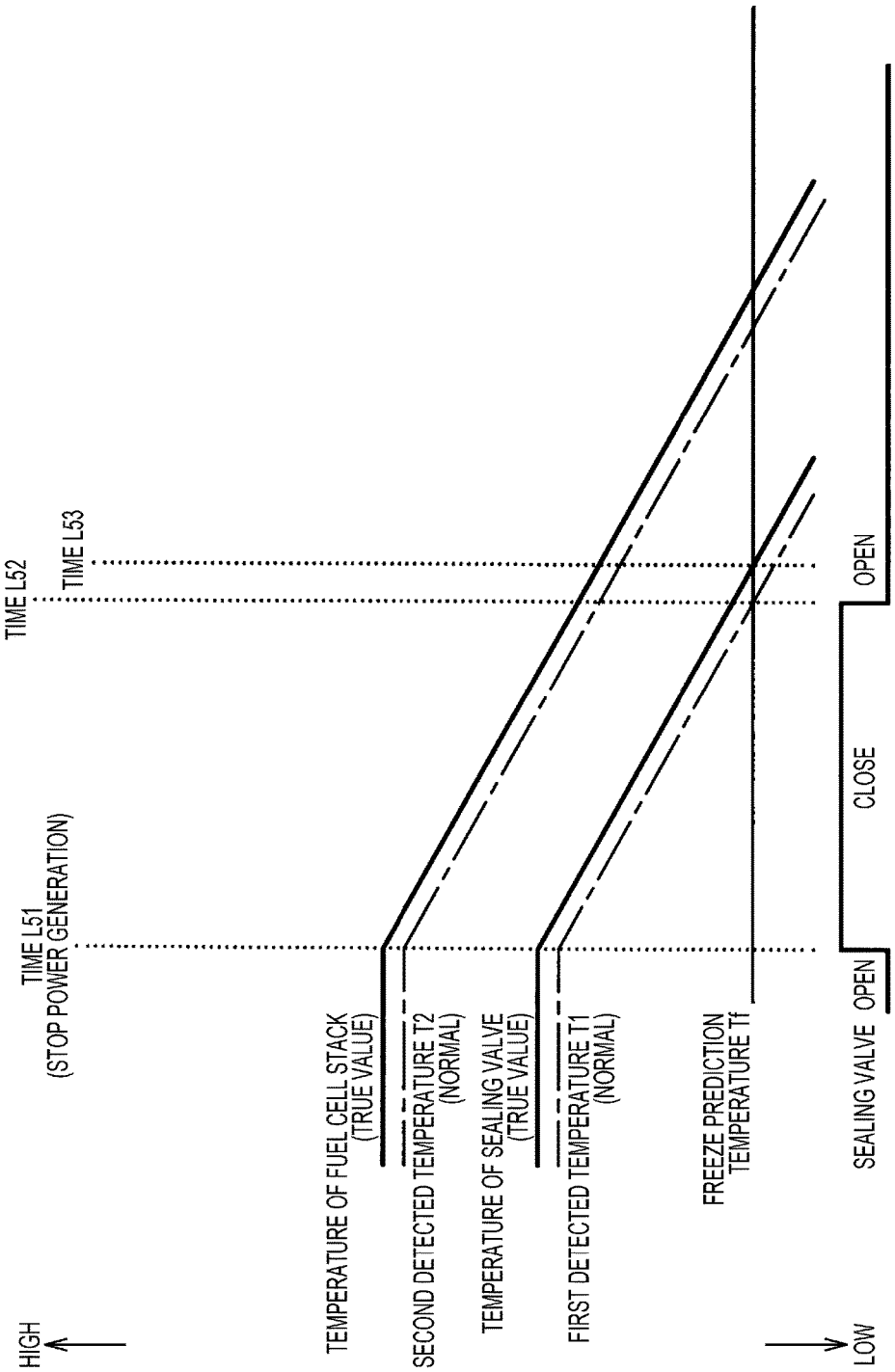

FUEL CELL SYSTEM AND METHOD OF CONTROLLING FUEL CELL SYSTEM

CROSS-REFERENCE TO RELATED APPLICATIONS

The present application claims priority under 35 U.S.C. § 119 to Japanese Patent Application No. 2016-025445, filed Feb. 15, 2016, entitled "Fuel Cell System and Method of Controlling Fuel Cell System." The contents of this application are incorporated herein by reference in their entirety.

BACKGROUND

1. Field

The present disclosure relates to a fuel cell system and a method of controlling the fuel cell system.

2. Description of the Related Art

A fuel cell generates power when supplied with hydrogen (fuel gas) and air (oxidant gas) containing oxygen. Such a fuel cell has an optimum power generation temperature (for example, 80 to 90° C. for PEFC) for optimum power generation according to the kind of catalyst (Pt or the like) for electrode reaction of hydrogen or air.

A fuel cell system described in Japanese Unexamined Patent Application Publication No. 2008-135285 includes a sealing valve provided on a cathode off-gas discharge passage for discharging cathode off-gas. The sealing valve seals the cathode off-gas discharge passage during the stop of power generation by a fuel cell.

Accordingly, generation of highly active OH radicals (hydroxyl radicals) is suppressed. As a result, the fuel cell is prevented from being deteriorated by the hydroxyl radicals oxidizing an electrode catalyst layer.

SUMMARY

According to one aspect of the present invention, a fuel cell system includes a fuel cell, a cathode off-gas discharge passage, a sealing valve, a first temperature sensor, a refrigerant circulation circuit, a second temperature sensor, and circuitry. The fuel cell is to generate electric power with heat. The cathode off-gas discharge passage is connected to the fuel cell. Cathode off-gas discharged from the fuel cell is to flow through the cathode off-gas discharge passage. The sealing valve is provided in the cathode off-gas discharge passage. The heat is transmitted from the fuel cell to the sealing valve. The first temperature sensor is to detect a valve temperature of the sealing valve. A refrigerant is to be circulated in the refrigerant circulation circuit to cool the fuel cell. The second temperature sensor is provided in the refrigerant circulation circuit to detect a fuel cell temperature of the fuel cell through the refrigerant. The circuitry is configured to calculate a sealing valve estimated temperature by subtracting a correction value from the fuel cell temperature detected by the second temperature sensor after the fuel cell stops generating the electric power and after the sealing valve is closed. The circuitry is configured to determine whether at least one of the valve temperature and the sealing valve estimated temperature is lower than a predicted freezing temperature. The circuitry is configured to open the sealing valve when it is determined that the at least one of the valve temperature and the sealing valve estimated temperature is lower than the predicted freezing temperature.

According to another aspect of the present invention, a method of controlling a fuel cell system includes detecting a valve temperature of a sealing valve. The sealing valve is provided in a cathode off-gas discharge passage through which cathode off-gas discharged from a fuel cell is to flow. The fuel cell is to generate power with heat which is transmitted to the sealing valve. A fuel cell temperature of the fuel cell is detected through a refrigerant to cool the fuel cell. A sealing valve estimated temperature that is an estimated temperature of the sealing valve is calculated by subtracting a correction value from the fuel cell temperature after the fuel cell stops generating the power and after the sealing valve is closed. Whether at least one of the valve temperature and the sealing valve estimated temperature is lower than a predicted freezing temperature is determined. The sealing valve is opened when it is determined that the at least one of the valve temperature and the sealing valve estimated temperature is lower than the predicted freezing temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 is a time chart illustrating an operation example when there is an abnormality in a first temperature sensor and a first detected temperature is larger than a true value.

FIG. 8 is a time chart illustrating an operation example when there is an abnormality in the first temperature sensor and the first detected temperature is smaller than the true value.

FIG. 9 is a time chart illustrating an operation example when there is an abnormality in a second temperature sensor and a second detected temperature is larger than a true value.

FIG. 10 is a time chart illustrating an operation example when there is an abnormality in the second temperature sensor and the second detected temperature is smaller than the true value.

FIG. 11 is a time chart illustrating an operation example when the first temperature sensor and the second temperature sensor are in normal operation.

DESCRIPTION OF THE EMBODIMENTS

Figure 1:
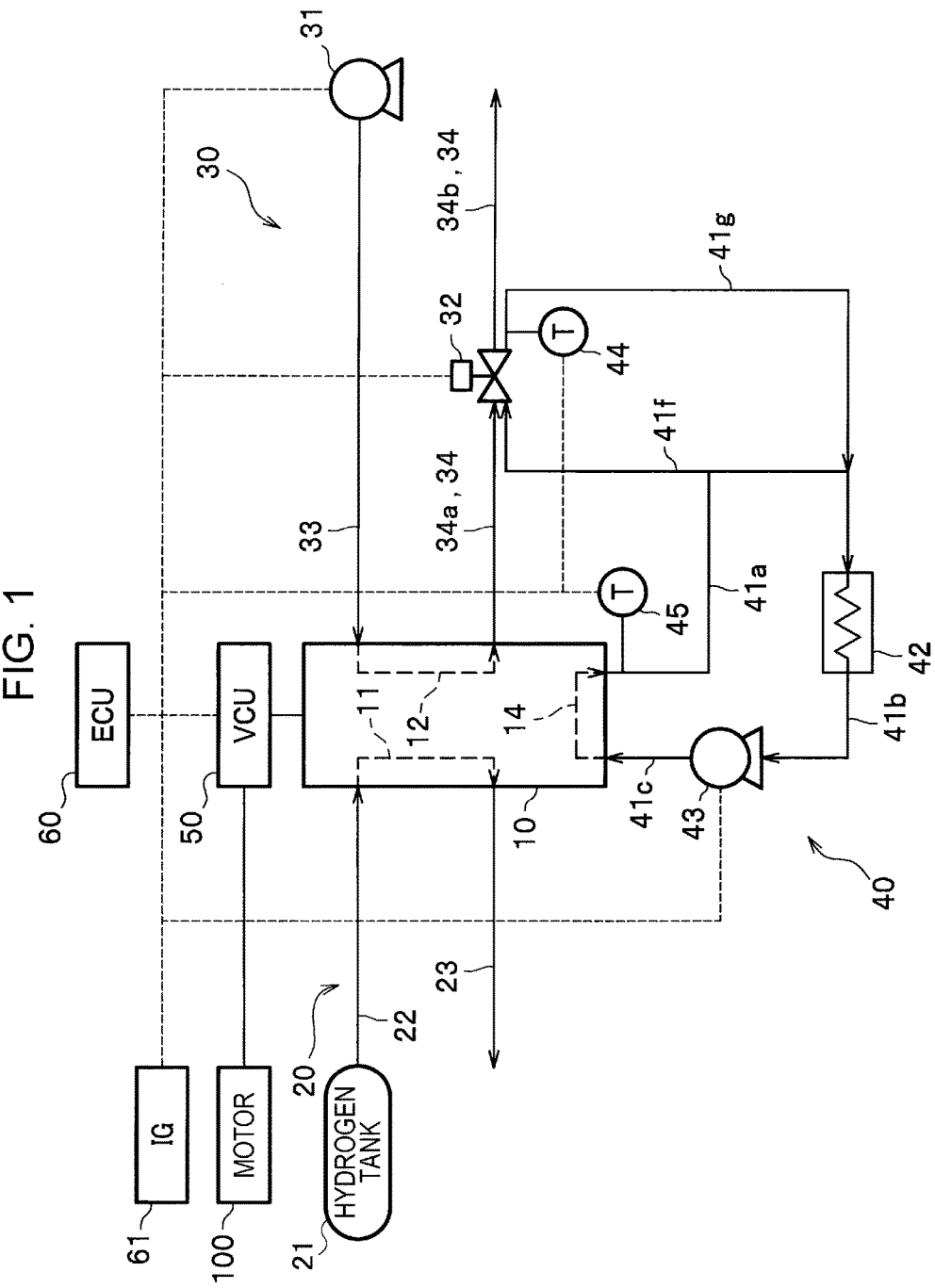
FIG. 1 is an overall configuration diagram of a fuel cell system.

The embodiments will now be described with reference to the accompanying drawings, wherein like reference numerals designate corresponding or identical elements throughout the various drawings.

Next, description is given of a fuel cell vehicle equipped with a fuel cell system according to an embodiment.

(Fuel Cell Vehicle)

As illustrated in FIG. 1, the fuel cell vehicle (not illustrated) includes: a fuel cell system 1 that generates power through electrochemical reaction between hydrogen supplied from a hydrogen tank 21 and air (oxygen) taken in from the outside of the vehicle; and a motor 100 that drives a wheel (front wheel).

(Fuel Cell System)

The fuel cell system 1 includes: a fuel cell stack 10; an anode system 20 that supplies and discharges hydrogen (fuel gas) to and from an anode of the fuel cell stack 10; a cathode system 30 that supplies and discharges air (oxidant gas) containing oxygen to and from a cathode of the fuel cell stack 10; a refrigerant system 40 that circulates a refrigerant through the fuel cell stack 10; a voltage current control unit 50 that controls power (output current, output voltage) generated by the fuel cell stack 10; and an ECU (Electronic Control Unit) 60 (circuitry 60) that electronically controls those described above.

(Fuel Cell Stack)

The fuel cell stack 10 includes a stacked plurality of solid polymer electrolyte single cells (fuel cells). The plurality of single cells are electrically connected in series.

The single cell includes an MEA (Membrane Electrode Assembly) and two conductive anode separator and cathode separator on either side thereof.

The MEA includes an electrolyte membrane (solid polymer membrane) made of a monovalent cation exchange membrane or the like and an anode and a cathode on either side thereof.

The anode separator has a groove and a through-hole formed therein to supply and discharge hydrogen to and from the anode in each MEA. These groove and through-hole function as an anode passage 11 (fuel gas passage).

The cathode separator has a groove and a through-hole formed therein to supply and discharge air to and from the cathode in each MEA. These groove and through-hole function as a cathode passage 12 (oxidant gas passage).

Then, when hydrogen is supplied to each anode through the anode passage 11 and air is supplied to each cathode through the cathode passage 12, electrode reaction occurs to generate a potential difference (OCV (Open Circuit Voltage)) in each single cell.

Next, the fuel cell stack 10 is electrically connected to an external circuit to take out current, thereby generating power.

When the fuel cell stack 10 generates power as described above, moisture (vapor) is generated in the cathode, and the moisture permeates through the electrolyte membrane to the anode side. Therefore, anode off-gas discharged from the anode and cathode off-gas discharged from the cathode both become humid.

The anode system 20 includes the hydrogen tank 21 that stores hydrogen at high pressure, a supply pipe 22 connected to the hydrogen tank 21 and to an inlet of the anode passage 11, and a discharge pipe 23 connected to an outlet of the anode passage 11 to discharge the anode off-gas to the outside of the vehicle.

The cathode system 30 includes an air pump 31 that pressure-feeds air (oxygen), a sealing valve 32, a supply pipe 33 connected to the air pump 31 and to an inlet of the cathode passage 12, and a discharge pipe 34 (upstream-side discharge pipe 34a and downstream-side discharge pipe 34b) connected to an outlet of the cathode passage 12 to discharge the cathode off-gas to the outside.

Note that the sealing valve 32 is described later.

(Refrigerant System)

The refrigerant system 40 includes: a refrigerant circulation passage (pipes 41a to 41c and a refrigerant passage 14 of the fuel cell stack 10) through which the refrigerant is circulated; a branch pipe 41f branched off from the pipe 41a to supply the refrigerant to the sealing valve 32; a return pipe 41g to merge the refrigerant discharged from the sealing valve 32 into the pipe 41a; a radiator 42 provided on the refrigerant circulation passage 41; a refrigerant pump 43 provided on the pipe 41e; and a first temperature sensor 44 and a second temperature sensor 45 that detect the temperature of the refrigerant. Thus, the refrigerant that has collected thermal energy (heat) from the fuel cell stack 10 is supplied to the sealing valve 32 through the branch pipe 41f.

The second temperature sensor 45 is a sensor for detecting the temperature of the fuel cell stack 10 through the temperature of the refrigerant flowing out of the outlet of the refrigerant passage 14. The second temperature sensor 45 is provided near the outlet of the refrigerant passage 14 on the pipe 41a.

The second temperature sensor 45 transmits a second detected temperature T2 that is the detected temperature of the fuel cell stack 10 to the ECU 60.

Note that the first temperature sensor 44 is described later.

(Sealing Valve)

Figure 2:
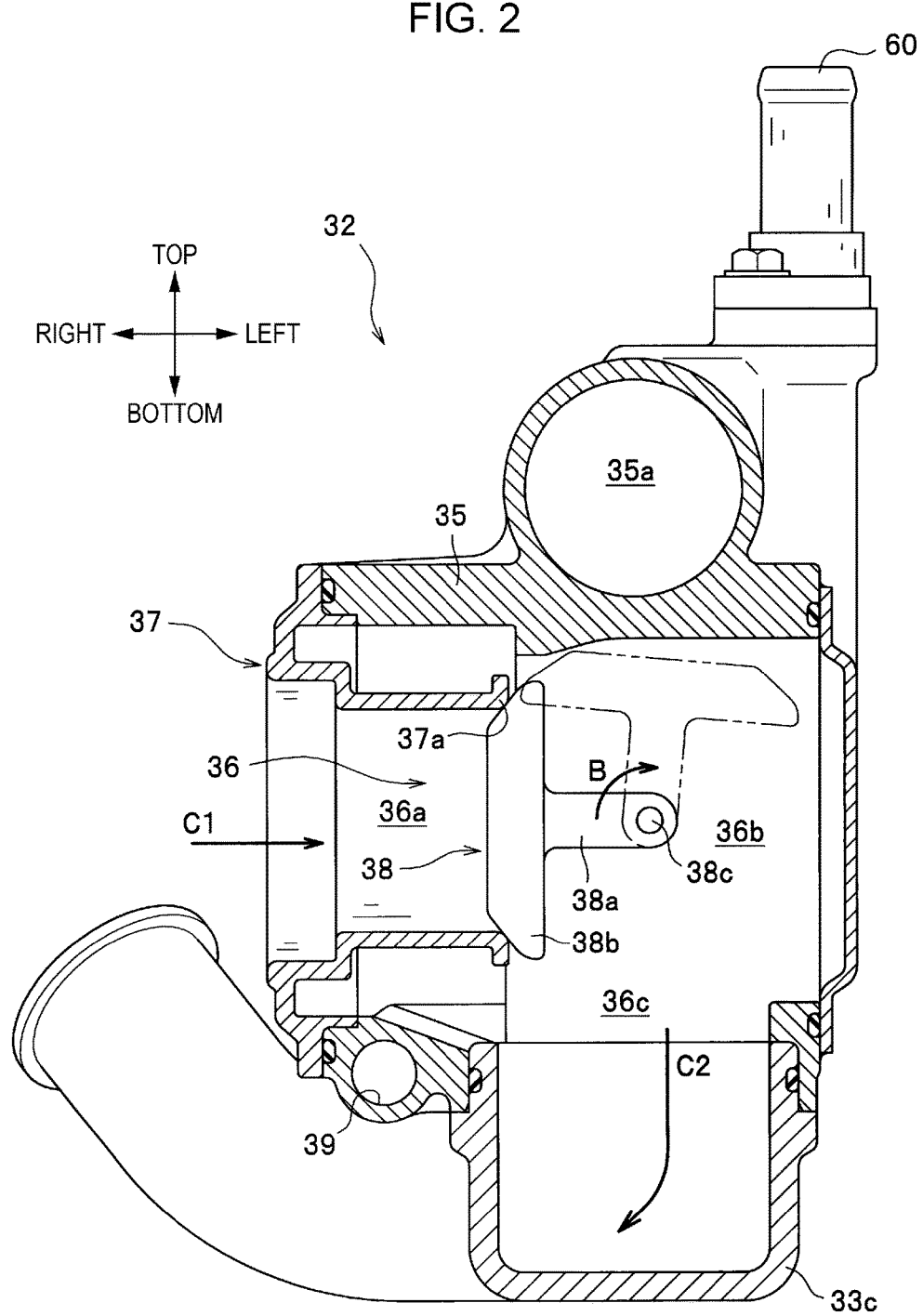
FIG. 2 is a cross-sectional view illustrating a sealing valve taken along the left-right direction and top-bottom direction.

As illustrated in FIG. 2, the sealing valve 32 includes a main body 35 having a passage 36 formed therein, through which the cathode off-gas flows, a valve seat 37, a valve element 38, and a refrigerant passage 39 that penetrates near the valve seat 37 in the main body 35.

Figure 3:
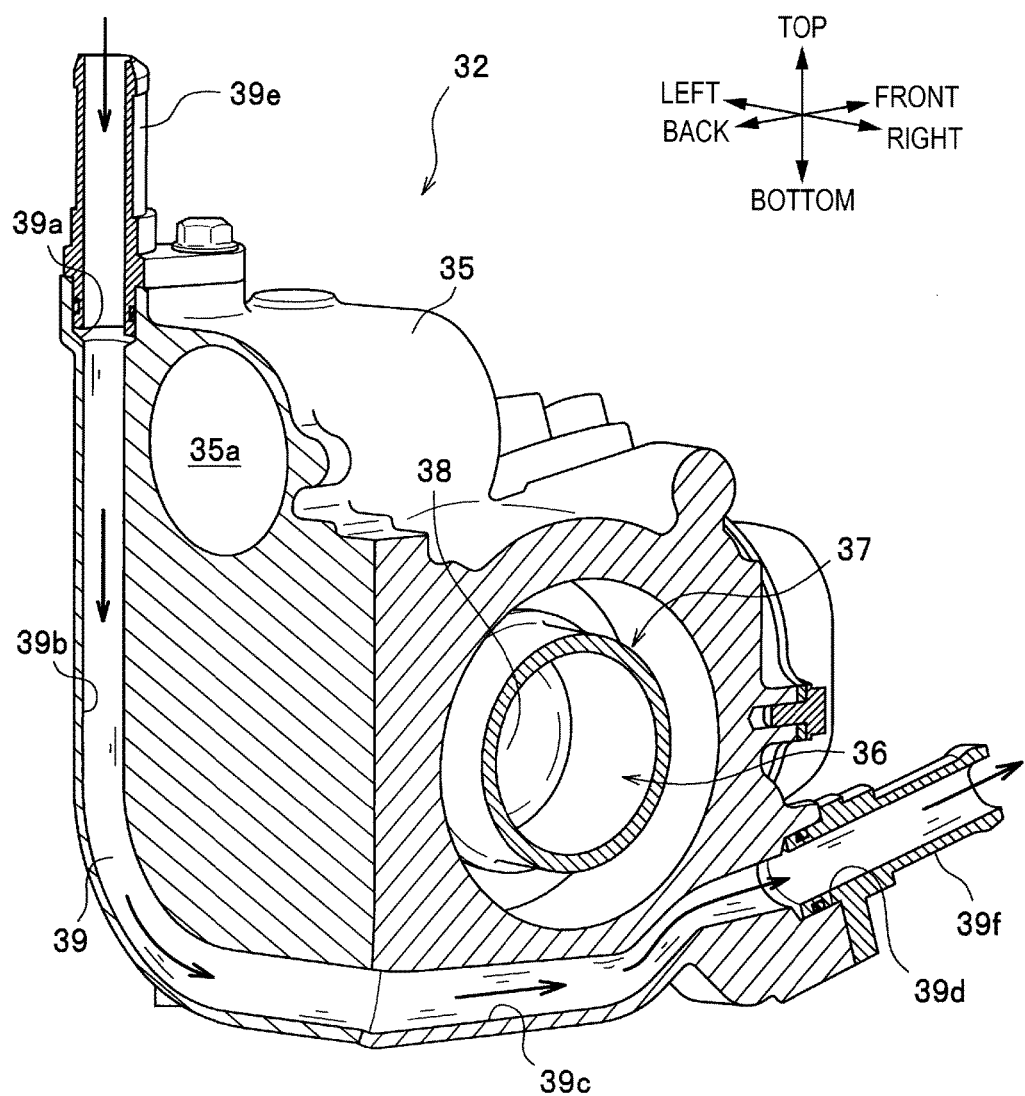
FIG. 3 is a cross-sectional view illustrating the sealing valve taken along a refrigerant passage.
Figure 4:
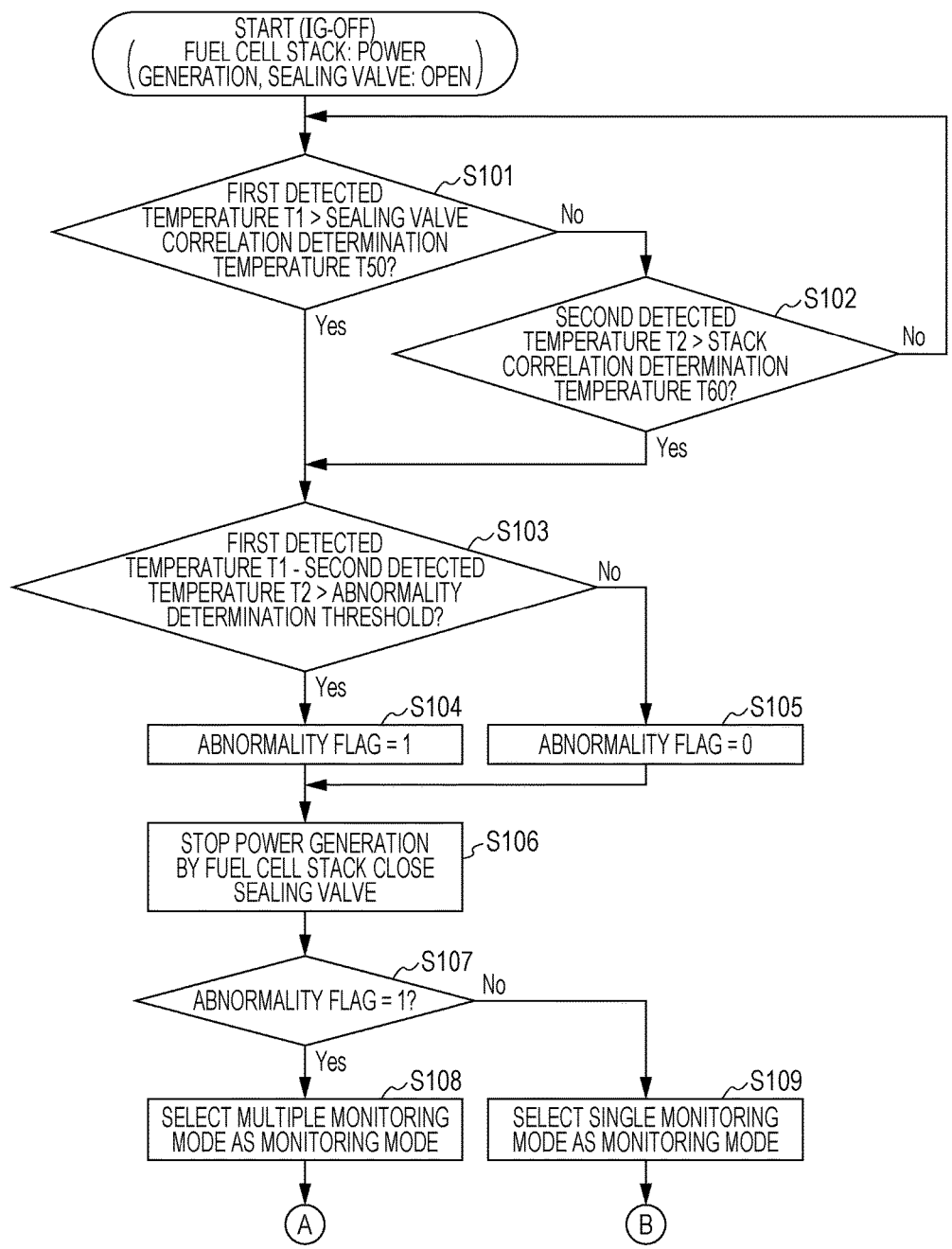
FIG. 4 is a first flowchart illustrating operations of the fuel cell system according to an embodiment.

Note that, for convenience of explanation, as for the left-right direction, top-bottom direction, and front-back direction, description is given based on the directions illustrated in FIGS. 2 and 3.

The passage 36 is formed into an L shape, including an inlet 36a that penetrates a right-side surface of the main body 35, a center passage 36b formed in the center of the main body 35 and communicated with the inlet 36a, and an outlet 36c that extends downward from the center passage 36b and penetrates a lower surface of the main body 35.

Also, an outlet of the upstream-side discharge pipe 34a (see FIG. 1) is connected to the inlet 36a, and an inlet of the downstream-side discharge pipe 34b is connected to the outlet 36c.

Note that, in the center passage 36b, a shaft member 38c is provided, which is rotated by driving an unillustrated valve element motor.

The valve element motor is housed in a housing space 35a formed above the center passage 36b in the main body 35.

The valve seat 37 is a cylindrical member extending in the left-right direction inside the inlet 36a. Moreover, a right-side inner peripheral edge of the valve seat 37 serves as a seating surface 37a on which the valve element 38 is seated.

The valve element 38 includes a columnar base part 38a fixed to the shaft member 38c and a disc-shaped seating part 38b provided on the tip of the base part 38a.

When the shaft member 38c is rotated by driving the valve element motor and the base part 38a faces to the right, the seating part 38b is seated on the seating surface 37a of the valve seat 37, and thus the inlet 36a is closed.

Thus, the downstream side of the upstream-side discharge pipe 34a is sealed to prevent air from flowing into the cathode passage 12 from the outside of the vehicle.

Figure 5:
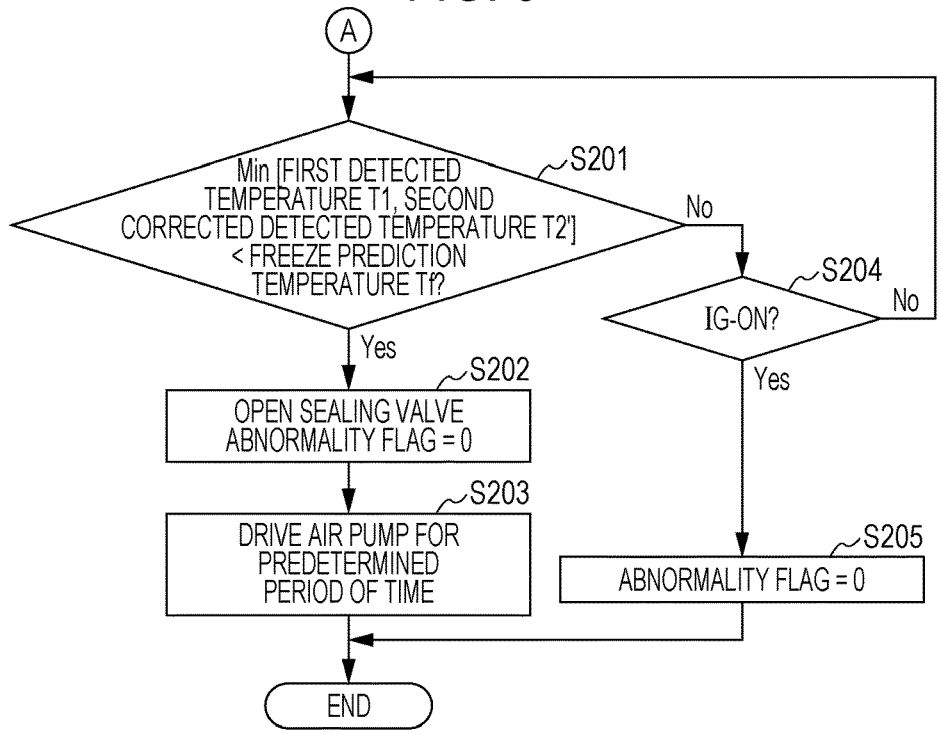
FIG. 5 is a second flowchart illustrating operations of the fuel cell system according to the embodiment.
Figure 6:
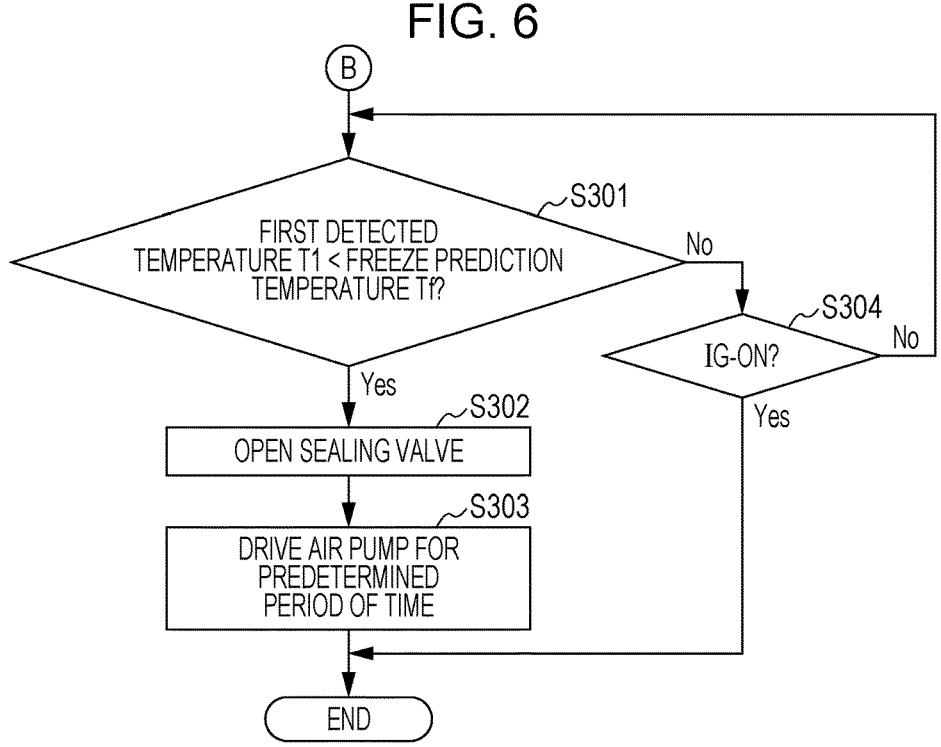
FIG. 6 is a third flowchart illustrating operations of the fuel cell system according to the embodiment.

On the other hand, when the shaft member 38c is rotated by driving the valve element motor (not illustrated) and the base part 38a faces upward (see the arrow B in FIG. 2), the seating part 38b is moved upward to open the inlet 36a. Thus, the cathode off-gas flowing into the sealing valve 32 passes through the center passage 36b and the outlet 36c, and then flows into the downstream-side discharge pipe 23b (see the arrows C1 and C2 in FIG. 5).

(Refrigerant Passage)

As illustrated in FIG. 3, the refrigerant passage 39 includes: a refrigerant inlet 39a that penetrates an upper surface of the main body 35 and has a refrigerant inflow port 39e attached thereto; an L-shaped first refrigerant passage 39b that extends downward from the refrigerant inlet 39a and bends rightward near a bottom surface of the main body 35; a second refrigerant passage 39c that extends forward from the first refrigerant passage 39b; and a refrigerant outlet 39d that penetrates a front surface of the main body 35 and has a refrigerant outflow port 39f attached thereto.

The branch pipe 41f (see FIG. 1) in the refrigerant system 40 is connected to the refrigerant inflow port 39e.

The return pipe 41g (see FIG. 1) in the refrigerant system 40 is connected to the refrigerant outflow port 39f.

According to the above configuration, the refrigerant heated by the fuel cell stack 10 flows through the refrigerant passage 39. Thus, thermal energy from the fuel cell stack 10 is supplied to the sealing valve 32 to increase the temperature of the sealing valve 32. Accordingly, the temperature of the sealing valve 32 is within a predetermined temperature difference with the fuel cell stack 10, and is correlated with the temperature of the fuel cell stack 10.

Moreover, in the embodiment, the refrigerant supplied to the sealing valve 32 does not pass through the radiator 42 or the like. The temperature of the sealing valve 32 is increased to a temperature close to that of the fuel cell stack 10.

Note that the temperature of the sealing valve 32 is not sufficiently increased immediately after the start of power generation by the fuel cell stack 10. Therefore, there is a large temperature difference between the sealing valve 32 and the fuel cell stack 10. As a result, the temperature of the sealing valve 32 and the temperature of the fuel cell stack 10 may not be correlated with each other.

Therefore, when the temperature of the sealing valve 32 reaches a predetermined temperature (hereinafter referred to as a sealing valve correlation determination temperature T50) or more (or when the temperature of the fuel cell stack 10 reaches a predetermined temperature (hereinafter referred to as a stack correlation determination temperature T60) or more), it can be regarded that the temperature of the sealing valve 32 is sufficiently increased and that the temperature of the sealing valve 32 and the temperature of the fuel cell stack 10 are correlated with each other.

The sealing valve correlation determination temperature T50 and the stack correlation determination temperature T60 are previously calculated by conducting an experiment or the like.

Moreover, the temperature of the fuel cell stack 10 that is a heat source is higher than that of the sealing valve 32. Therefore, the stack correlation determination temperature T60 has a value higher than that of the sealing valve correlation determination temperature T50, such as the stack correlation determination temperature T60 being 60° C. and the sealing valve correlation determination temperature T50 being 50° C., for example.

The first temperature sensor 44 is a sensor for detecting the temperature of the sealing valve 32 through the temperature of the refrigerant flowing out of the refrigerant passage 39 in the sealing valve 32. The first temperature sensor 44 is provided near the refrigerant outflow port 39f on the return pipe 41g.

The first temperature sensor 44 transmits a first detected temperature T1 (a valve temperature T1) that is the detected temperature of the sealing valve 32 to the ECU 60.

<Other Devices>

As illustrated in FIG. 1, an IG 61 is a switch to start the fuel cell vehicle (fuel cell system 1), which is disposed around a driver seat.

The IG 61 is connected to the ECU 60, and the ECU 60 detects an ON signal/OFF signal from the IG 61.

<ECU>

The ECU 60 is a controller that electronically controls the fuel cell system 1, and includes a CPU, a ROM, a RAM, various interfaces, electronic circuits, and the like. The ECU 60 controls various devices by executing the following functions according to programs stored therein.

The ECU 60 closes the sealing valve 32 after the power generation by the fuel cell stack 10 is stopped.

Also, the ECU 60 has a function to shift to a monitoring mode after closing the sealing valve 32 to monitor the temperature of the sealing valve 32.

The ECU 60 has a function to calculate an estimated temperature (hereinafter referred to as a second corrected detected temperature T2'(a sealing valve estimated temperature T2')) of the sealing valve 32 by subtracting a correction value α from the second detected temperature T2 (a fuel cell temperature T2) detected by the second temperature sensor 45.

Here, the correction value α is obtained by adding up a "temperature difference α1 between the fuel cell stack 10 and the sealing valve 32 when there is a correlation therebetween" and a "temperature difference α2 caused by a cooling rate difference between the fuel cell stack 10 and the sealing valve 32 after the power generation is stopped".

The "temperature difference α1 between the fuel cell stack 10 and the sealing valve 32 when there is a correlation therebetween" is a temperature difference caused between the fuel cell stack 10 and the sealing valve 32 when the temperature of the sealing valve 32 is not less than the sealing valve correlation determination temperature T50 (or when the temperature of the fuel cell stack 10 is not less than the stack correlation determination temperature T60), and is a value previously calculated by an experiment or the like.

Moreover, the temperature difference caused when the power generation is stopped can be corrected between the fuel cell stack 10 and the sealing valve 32 by subtracting the "temperature difference α1 between the fuel cell stack 10 and the sealing valve 32 when there is a correlation therebetween" from the second detected temperature T2.

Also, the fuel cell stack 10 and the sealing valve 32 are different in area that contacts with the outside air, and therefore in temperature to be lowered per unit time. To be more specific, after the power generation is stopped, the temperature of the fuel cell stack 10 is lowered by 2° C. per hour, and the temperature of the sealing valve 32 is lowered by 5° C. per hour. Thus, a difference in temperature to be lowered per hour therebetween is 3° C.

Therefore, the "temperature difference α2 caused by a cooling rate difference between the fuel cell stack 10 and the sealing valve 32 after the power generation is stopped" is a value obtained by multiplying the cooling temperature difference per unit time calculated by an experiment or the like (in the case of the above example, 3° C.) by an elapsed time t between after the stop of the power generation and the detection of the temperature.

Moreover, the temperature difference caused before the detection of the second detected temperature T2 after the stop of the power generation can be corrected by subtracting the "temperature difference α2 caused by a cooling rate difference between the fuel cell stack 10 and the sealing valve 32 after the power generation is stopped" from the second detected temperature T2.

Note that, in this embodiment, description is given assuming that the fuel cell stack 10 and the sealing valve 32 have the same cooling temperature per unit time ($\alpha 2=0°$ C.) (see FIGS. 7 to 11).

(Operations of Fuel Cell System)

Next, description is given of operations of the fuel cell system 1.

Note that, in the description of the operations, description is given of an operation when the ECU 60 detects an OFF signal (system stop signal) of the IG 61 if the IG 61 is in the ON state and the fuel cell stack 10 is generating power (Start).

In Step S101, the ECU 60 determines whether or not the first detected temperature T1 is larger than the sealing valve correlation determination temperature T50.

When it is determined that the first detected temperature T1 is larger than the sealing valve correlation determination temperature T50 (Yes in S101), the processing advances to Step S103, determining that the temperature of the sealing valve 32 and the temperature of the fuel cell stack 10 are correlated with each other.

On the other hand, when it is determined that the first detected temperature T1 is not larger than the sealing valve correlation determination temperature T50 (No in S101), the processing advances to Step S102, determining that the temperature of the sealing valve 32 and the temperature of the fuel cell stack 10 are not actually correlated with each other or that there is an abnormality in the first temperature sensor 44.

In Step S102, the ECU 60 determines whether or not the second detected temperature T2 is larger than the stack correlation determination temperature T60.

When it is determined that the second detected temperature T2 is larger than the stack correlation determination temperature T60 (Yes in S102), the processing advances to Step S103, determining that the temperature of the sealing valve 32 and the temperature of the fuel cell stack 10 are correlated with each other.

On the other hand, when it is determined that the second detected temperature T2 is not larger than the stack correlation determination temperature T60 (No in S102), the processing returns to Step S101, determining that the temperature of the sealing valve 32 and the temperature of the fuel cell stack 10 are not correlated with each other. Then, the power generation by the fuel cell stack 10 is continued.

In Step S103, to see if there is something wrong with the first temperature sensor 44 or the second temperature sensor 45, it is determined whether or not the following Expression (1) is satisfied.

$$\text{first detected temperature } T1 - \text{second detected temperature } T2 > \text{abnormality determination threshold} \quad (1)$$

The abnormality determination threshold is a value previously calculated by conducting an experiment. The abnormality determination threshold is a value obtained by subtracting the second detected temperature T2 from the first detected temperature T1 when the temperature of the sealing valve 32 and the temperature of the fuel cell stack 10 are correlated with each other and there is no abnormality in the first temperature sensor 44 and the second temperature sensor 45.

Moreover, since the temperature of the fuel cell stack 10 is normally higher than the temperature of the sealing valve 32, the abnormality determination threshold is lower than 0° C.

Note that the first detected temperature T1 and the second detected temperature T2 may be increased or lowered as needed since the both may include errors.

When it is determined that the above Expression (1) is satisfied, the processing advances to Step S104 to set up an abnormality flag, determining that there is an abnormality in the first temperature sensor 44 or the second temperature sensor 45, and then advances to Step S106.

On the other hand, when it is determined that the above Expression (1) is not satisfied, the processing advances to Step S105, determining that there is no abnormality in the first temperature sensor 44 and the second temperature sensor 45, and then advances to Step S106 without setting up the abnormality flag.

In Step S106, the ECU 60 stops the supply of hydrogen and air, and starts the procedure of stopping the power generation by the fuel cell stack 10. The ECU 60 stops the driving of the refrigerant pump 43 to stop the circulation of the refrigerant. The ECU 60 further closes the sealing valve 32.

The ECU 60 shifts to the monitoring mode.

In Step S107, the ECU 60 determines whether or not the abnormality flag is set up. When it is determined that the abnormality flag is set up (Yes in S107), the processing advances to Step S108 to select a multiple monitoring mode, and then advances to Step S201.

On the other hand, when it is determined that the abnormality flag is not set up (No in S107), the processing advances to Step S109 to select a single monitoring mode, and then advances to Step S301.

The multiple monitoring mode is first described below, and then the single monitoring mode.

(Multiple Monitoring Mode)

In Step S201, it is determined whether or not the lower value between the first detected temperature T1 and the second corrected detected temperature T2' is smaller than a freeze prediction temperature Tf (a predicted freezing temperature Tf).

Note that the freeze prediction temperature Tf is a temperature at which the sealing valve 32 is predicted to be frozen when the temperature of the sealing valve 32 gets lower.

When it is determined that the first detected temperature T1 and the second corrected detected temperature T2' is smaller than the freeze prediction temperature Tf, the processing advances to Step S202.

On the other hand, when it is determined that the first detected temperature T1 and the second corrected detected temperature T2' are not less than the freeze prediction temperature Tf, the processing advances to Step S205.

In Step S202, the ECU 60 opens the sealing valve 32. Also, the abnormality flag is set down, and the processing advances to Step S203.

In Step S203, the air pump 31 is driven for a predetermined period of time. Accordingly, the moisture can be discharged to the outside, and thus the frozen moisture can be prevented from blocking the inside of the sealing valve 32 and the like.

Then, the multiple monitoring mode is terminated after the elapse of the predetermined period of time (END).

In Step S204, the ECU 60 determines whether or not an ON signal from the IG 61 is detected.

When it is determined that no ON signal from the IG 61 is detected, the processing returns to Step S201.

On the other hand, when it is determined that the ON signal from the IG 61 is detected, the processing advances to Step S206 to set down the abnormality flag and terminate the multiple monitoring mode (END).

(Single Monitoring Mode)

In Step S301, the ECU 60 determines whether or not the first detected temperature T1 is smaller than the freeze prediction temperature Tf.

When it is determined that the first detected temperature T1 is smaller than the freeze prediction temperature Tf, the processing advances to Step S302.

On the other hand, when it is determined that the first detected temperature T1 is not less than the freeze prediction temperature Tf, the processing advances to Step S304.

The ECU 60 opens the sealing valve 32 in Step S302, and then advances to Step S303.

In Step S303, the air pump 31 is driven for a predetermined period of time. Then, the single monitoring mode is terminated after the elapse of the predetermined period of time (END).

In Step S304, the ECU 60 determines whether or not an ON signal from the IG 61 is detected.

When it is determined that no ON signal from the IG 61 is detected, the processing returns to Step S301.

On the other hand, when it is determined that the ON signal from the IG 61 is detected, the single monitoring mode is terminated (END).

(Effects of Fuel Cell System)

Next, description is given of effects of the fuel cell system 1 according to the embodiment.

The description is given first of the case where there is an abnormality in the first temperature sensor 44 or the second temperature sensor 45, and then of the case where the first temperature sensor 44 and the second temperature sensor 45 are in normal operation.

(Abnormality in First Temperature Sensor (1))

As illustrated in FIG. 7, when there is an abnormality in the first temperature sensor 44 (Yes in S103) and the first detected temperature T1 illustrates a value higher than the temperature (true value) of the sealing valve 32, it is determined that the second corrected detected temperature T2' is lower than the freeze prediction temperature Tf at the time L12 (Yes in S201), and the sealing valve 32 is opened (S202).

Thus, the sealing valve 32 is opened (at the time L12) before the temperature (true value) of the sealing valve 32 reaches the freeze prediction temperature Tf, which is around the time L13 when the temperature (true value) of the sealing valve 32 reaches the freeze prediction temperature Tf.

(Abnormality in First Temperature Sensor (2))

As illustrated in FIG. 8, when there is an abnormality in the first temperature sensor 44 (Yes in S103) and the first detected temperature T1 illustrates a value lower than the temperature (true value) of the sealing valve 32, it is determined that the first detected temperature T1 is lower than the freeze prediction temperature Tf at the time L22 (Yes in S201), and the sealing valve 32 is opened (S202).

Thus, the sealing valve 32 is opened (at the time L22) before the time L24 when the temperature (true value) of the sealing valve 32 reaches the freeze prediction temperature Tf.

(Abnormality in Second Temperature Sensor (3))

As illustrated in FIG. 9, when there is an abnormality in the second temperature sensor 45 (Yes in S103) and the second detected temperature T2 illustrates a value higher than the temperature (true value) of the fuel cell stack 10, it is determined that the first detected temperature T1 is lower than the freeze prediction temperature Tf at the time L32 (Yes in S201), and the sealing valve 32 is opened (S202).

Thus, the sealing valve 32 is opened (at the time L32) before the temperature (true value) of the sealing valve 32 reaches the freeze prediction temperature Tf, which is around the time L33 when the temperature (true value) of the sealing valve 32 reaches the freeze prediction temperature Tf.

(Abnormality in Second Temperature Sensor (4))

As illustrated in FIG. 10, when there is an abnormality in the second temperature sensor 45 (Yes in S103) and the second detected temperature T2 illustrates a value lower than the temperature (true value) of the fuel cell stack 10, it is determined that the second corrected detected temperature T2' is lower than the freeze prediction temperature Tf at the time L42 (Yes in S201), and the sealing valve 32 is opened (S202).

Thus, the sealing valve 32 is opened (at the time L42) before the time L44 when the temperature (true value) of the sealing valve 32 reaches the freeze prediction temperature Tf.

(First Temperature Sensor and Second Temperature Sensor in Normal Operation)

Next, description is given of the case where the first temperature sensor 44 and the second temperature sensor 45 are in normal operation (No in S103).

As illustrated in FIG. 11, it is determined that the first detected temperature T1 is lower than the freeze prediction temperature Tf at the time L52 (Yes in S301), and the sealing valve 32 is opened (S302).

Thus, the sealing valve 32 is opened (at the time L52) before the temperature (true value) of the sealing valve 32 reaches the freeze prediction temperature Tf, which is around the time L53 when the temperature (true value) of the sealing valve 32 reaches the freeze prediction temperature Tf.

Thus, according to the embodiment, the sealing valve 32 is opened before being frozen even when an abnormality occurs in the first temperature sensor 44 or the second temperature sensor 45. As a result, the sealing valve 32 can be surely prevented from being frozen in the closed state.

Moreover, according to the embodiment, the second temperature sensor 45 in the refrigerant circulation circuit is used to monitor the temperature of the sealing valve 32. Therefore, it can be avoided to further install another temperature sensor (first temperature sensor 44) for the sealing valve 32. Thus, redundancy of temperature sensors can be avoided.

Furthermore, according to the embodiment, when the single monitoring mode is selected, it is determined whether or not the sealing valve 32 is frozen, based on more accurate temperature information (first detected temperature T1) rather than the second corrected detected temperature T2'. Thus, unnecessary opening of the valve can be avoided.

Besides the above, according to this embodiment, the power generation by the fuel cell stack 10 is continued until it is determined that the temperature of the sealing valve 32 and the temperature of the fuel cell stack 10 are correlated with each other (Yes in S101 or Yes in S102). Thus, the second corrected detected temperature T2' that is the estimated temperature of the sealing valve 32 is highly reliable.

Note that, according to this embodiment, there is a case where it is determined that the temperature of the sealing valve 32 and the temperature of the fuel cell stack 10 are correlated with each other because of the abnormality in the first temperature sensor 44 (Yes in S101).

Even in such a case, it is determined in Step S103 that there is an abnormality (No in S103), and the multiple monitoring mode is selected. Then, as described above regarding "Abnormality in First Temperature Sensor (1)", opening of the valve is determined based on the second corrected detected temperature T2'. Thus, the sealing valve 32 can be surely prevented from being frozen in the closed state.

While the fuel cell system 1 according to the embodiment has been described above, the embodiment is not limited thereto.

For example, in the above embodiment, the refrigerant is supplied to the sealing valve 32 in order for the temperature of the sealing valve 32 and the temperature of the fuel cell stack 10 to be correlated with each other. However, the embodiment is not limited thereto.

For example, the temperature of the sealing valve 32 and the temperature of the fuel cell stack 10 may be correlated with each other by attaching the sealing valve 32 to the fuel cell stack 10 to be integrated therewith or by forming a metal member (for example, end plate) included in the fuel cell stack 10 integrally with the sealing valve 32.

Note that the embodiment is preferable since the temperature of the sealing valve 32 can be approximated more to the temperature of the fuel cell stack 10, and the reliability of the second corrected detected temperature T2' can be increased.

Moreover, although the first temperature sensor 44 to detect the temperature of the refrigerant is used as a first temperature detector in the embodiment, a sensor to detect the temperature of the sealing valve 32 itself may be used.

Moreover, in the embodiment, comparison is made with the sealing valve correlation determination temperature T50 or the stack correlation determination temperature T60, in order to determine whether or not the temperature of the sealing valve 32 and the temperature of the fuel cell stack 10 are correlated with each other. However, the determination of whether or not there is a correlation may be made by determining if power generation time of the fuel cell stack 10 is a predetermined period of time or more. The embodiment is not limited thereto.

Furthermore, according to the embodiment, it is determined whether or not there is something wrong with the first temperature sensor 44 or the second temperature sensor 45 (S103), and the single monitoring mode or the multiple monitoring mode is selected as the monitoring mode (S108 and S109). However, the multiple monitoring mode may be selected from the beginning without determining whether or not there is something wrong with the first temperature sensor 44 or the second temperature sensor 45.

Besides the above, when the power generation by the fuel cell stack 10 is started by detecting the ON signal from the IG 61, the ECU 60 may always make corrections with the first temperature sensor 44 and the second temperature sensor 45. Thus, the temperature of the sealing valve 32 can be accurately known.

A fuel cell system according to an embodiment includes: a fuel cell; a cathode off-gas discharge passage through which cathode off-gas discharged from the fuel cell flows; a sealing valve provided on the cathode off-gas discharge passage; a first temperature detector configured to detect a temperature of the sealing valve; a refrigerant circulation circuit in which a refrigerant that cools the fuel cell is circulated; a second temperature detector provided on the refrigerant circulation circuit and configured to detect a temperature of the fuel cell through the refrigerant; and a controller configured to control opening and closing of the sealing valve, wherein the sealing valve is supplied with thermal energy of the fuel cell that is generating power, the temperature of the sealing valve and the temperature of the fuel cell are correlated with each other, the controller shifts to a monitoring mode of monitoring the temperature of the sealing valve after the power generation by the fuel cell is stopped and after the sealing valve is closed, the monitoring mode includes a multiple monitoring mode, the multiple monitoring mode is a mode of calculating a second corrected detected temperature that is an estimated temperature of the sealing valve by subtracting a correction value from a second detected temperature detected by the second temperature detector, and monitoring a first detected temperature detected by the first temperature detector and the second corrected detected temperature, and opening the sealing valve when determining that the first detected temperature or the second corrected detected temperature is lower than a freeze prediction temperature.

According to the embodiment, the controller monitors the temperature of the sealing valve in the multiple monitoring mode (monitoring mode), and opens the sealing valve when the temperature of the sealing valve gets lower than the freeze prediction temperature before the sealing valve is frozen. Thus, the sealing valve can be prevented from being frozen in the closed state.

Moreover, since the temperature of the sealing valve and the temperature of the fuel cell stack are correlated with each other, the estimated temperature of the sealing valve (the second corrected detected temperature) can be calculated based on the second detected temperature detected by the second temperature detector.

In the multiple monitoring mode, the first detected temperature and the second corrected detected temperature (estimated temperature of the sealing valve) are both monitored. Therefore, even when there is an abnormality in any one of the first temperature detector and the second temperature detector, determination can be made based on the other. Thus, the sealing valve can be surely prevented from being frozen in the closed state.

Furthermore, the second temperature detector in the refrigerant circulation circuit is used to monitor the two detected temperatures (the first detected temperature and the second corrected detected temperature). Therefore, it can be avoided to further install another temperature detector for the sealing valve. In other words, redundancy of temperature detectors can be avoided.

In the embodiment, it is preferable that the monitoring mode includes a single monitoring mode, the single monitoring mode is a mode of monitoring the first detected temperature and opening the sealing valve when determining that the first detected temperature is lower than the freeze prediction temperature, and the controller calculates a difference value by subtracting the first detected temperature from the second detected temperature before stopping the power generation by the fuel cell, and compares the difference value with an abnormality determination threshold, selects the multiple monitoring mode as the monitoring mode when determining that the difference value is larger than the abnormality determination threshold, and selects the single monitoring mode as the monitoring mode when determining that the difference value is not larger than the abnormality determination threshold.

According to the embodiment, when it is determined that the difference value is not larger than the abnormality determination threshold, the controller determines that there is no abnormality in the first temperature detector and second temperature detector (that the first temperature detector and second temperature detector are in normal operation), and monitors the first detected temperature.

Therefore, the temperature of the sealing valve itself is monitored, rather than the estimated temperature of the sealing valve (second corrected detected temperature). Thus, it can be determined whether or not the sealing valve is to be frozen, based on accurate temperature information. As a result, unnecessary opening of the valve may be avoided.

In the embodiment, it is preferable that the controller determines whether or not the temperature of the sealing valve and the temperature of the fuel cell are correlated with each other upon receipt of a system stop signal, shifts to the monitoring mode after stopping the power generation by the fuel cell and closing the sealing valve when determining that the temperature of the sealing valve and the temperature of the fuel cell are correlated with each other, and continues the power generation by the fuel cell when determining that the temperature of the sealing valve and the temperature of the fuel cell are not correlated with each other.

According to the above configuration, when the fuel cell and the sealing valve are not correlated with each other, the power generation by the fuel cell is continued without stopping the power generation to increase the temperatures of the fuel cell and the sealing valve. Thus, the reliability of the second corrected detected temperature can be increased, and the sealing valve can be surely prevented from being frozen in the closed state.

In the embodiment, it is preferable that the controller drives an air pump when opening the sealing valve during the monitoring mode.

According to the above configuration, moisture can be discharged to the outside and can be prevented from being frozen and blocking the cathode off-gas discharge passage.

In the embodiment, it is preferable that the refrigerant circulation circuit supplies the refrigerant discharged from the fuel cell to the sealing valve, and the sealing valve is supplied with thermal energy of the fuel cell through the refrigerant.

According to the above configuration, the temperature of the sealing valve can be approximated more to the temperature of the fuel cell, and the reliability of the second corrected detected temperature can be increased.

A method of controlling a fuel cell system including a fuel cell, a cathode off-gas discharge passage through which cathode off-gas discharged from the fuel cell flows, a sealing valve provided on the cathode off-gas discharge passage, a first temperature detector configured to detect a temperature of the sealing valve, a refrigerant circulation circuit in which a refrigerant that cools the fuel cell is circulated, a second temperature detector provided on the refrigerant circulation circuit and configured to detect a temperature of the fuel cell through the refrigerant, and a controller configured to control opening and closing of the sealing valve, wherein the sealing valve is supplied with thermal energy of the fuel cell that is generating power, and the temperature of the sealing valve and the temperature of the fuel cell are correlated with each other, the method including a multiple monitoring step of monitoring the temperature of the sealing valve after the power generation by the fuel cell is stopped and after the sealing valve is closed, the multiple monitoring step includes calculating a second corrected detected temperature that is an estimated temperature of the sealing valve by subtracting a correction value from a second detected temperature detected by the second temperature detector, and monitoring a first detected temperature detected by the first temperature detector and the second corrected detected temperature, and opening the sealing valve when determining that the first detected temperature or the second corrected detected temperature is lower than a freeze prediction temperature.

According to the embodiment, the controller monitors the temperature of the sealing valve in the multiple monitoring step, and opens the sealing valve when the temperature of the sealing valve gets lower than the freeze prediction temperature before the sealing valve is frozen. Thus, the sealing valve can be prevented from being frozen in the closed state.

Moreover, since the temperature of the sealing valve and the temperature of the fuel cell stack are correlated with each other, the estimated temperature of the sealing valve (the second corrected detected temperature) can be calculated based on the second detected temperature detected by the second temperature detector.

In the multiple monitoring step, the first detected temperature and the second corrected detected temperature (estimated temperature of the sealing valve) are both monitored. Therefore, even when there is an abnormality in any one of the first temperature detector and the second temperature detector, determination can be made based on the other. Thus, the sealing valve can be surely prevented from being frozen in the closed state.

According to the embodiment, a fuel cell system and a method of controlling the fuel cell system can be provided, which can prevent a sealing valve from being frozen in a closed state during the stop of power generation by a fuel cell.

Obviously, numerous modifications and variations of the present invention are possible in light of the above teachings. It is therefore to be understood that within the scope of the appended claims, the invention may be practiced otherwise than as specifically described herein.

What is claimed is:
1. A fuel cell system comprising:
a fuel cell to generate electric power with heat;
a cathode off-gas discharge passage connected to the fuel cell, cathode off-gas discharged from the fuel cell to flow through the cathode off-gas discharge passage;
a sealing valve which is provided in the cathode off-gas discharge passage and to which the heat is transmitted from the fuel cell;
a first temperature sensor to detect a valve temperature of the sealing valve;
a refrigerant circulation circuit in which a refrigerant is to be circulated to cool the fuel cell;
a second temperature sensor provided in the refrigerant circulation circuit to detect a fuel cell temperature of the fuel cell through the refrigerant; and
circuitry configured:
to calculate a sealing valve estimated temperature by subtracting a correction value from the fuel cell temperature detected by the second temperature sensor after the fuel cell stops generating the electric power and after the sealing valve is closed;
to determine whether at least one of the valve temperature and the sealing valve estimated temperature is lower than a predicted freezing temperature; and
to open the sealing valve when it is determined that the at least one of the valve temperature and the sealing valve estimated temperature is lower than the predicted freezing temperature.

2. The fuel cell system according to claim 1, wherein the circuitry is configured to calculate a difference value by subtracting the valve temperature from the fuel cell temperature before the fuel cell stops generating the power, to determine whether the difference value is larger than an abnormality determination threshold, to calculate the sealing valve estimated temperature after the fuel cell stops generating the power and after the sealing valve is closed, when it is determined that the difference value is larger than the abnormality determination threshold, to determine whether the at least one of the valve temperature and the sealing valve estimated temperature is lower than the predicted freezing temperature, when it is determined that the difference value is larger than the abnormality determination threshold, and to determine whether the valve temperature is lower than the predicted freezing temperature after the fuel cell stops generating the power and after the sealing valve is closed, when it is determined that the difference value is not larger than the abnormality determination threshold.

3. The fuel cell system according to claim 1, wherein the circuitry is configured to determine whether or not the temperature of the sealing valve and the temperature of the fuel cell are correlated with each other upon receipt of a system stop signal, to control the fuel cell to stop generating the power and to close the sealing valve to monitor at least one of the valve temperature and the sealing valve estimated temperature when it is determined that the temperature of the sealing valve and the temperature of the fuel cell are correlated with each other, and to control the fuel cell to continue generating the power when it is determined that the temperature of the sealing valve and the temperature of the fuel cell are not correlated with each other.

4. The fuel cell system according to claim 1, wherein the circuitry is configured to drive an air pump when the sealing valve is opened when it is determined that the at least one of the valve temperature and the sealing valve estimated temperature is lower than the predicted freezing temperature.

5. The fuel cell system according to claim 1, wherein the refrigerant circulation circuit supplies the refrigerant discharged from the fuel cell to the sealing valve, and wherein the heat of the fuel cell is supplied to the sealing valve through the refrigerant.

6. The fuel cell system according to claim 1, wherein the temperature of the sealing valve and the temperature of the fuel cell are correlated with each other.

7. A method of controlling a fuel cell system, comprising:

detecting a valve temperature of a sealing valve, the sealing valve being provided in a cathode off-gas discharge passage through which cathode off-gas discharged from a fuel cell is to flow, the fuel cell being to generate power with heat which is transmitted to the sealing valve;

detecting a fuel cell temperature of the fuel cell through a refrigerant to cool the fuel cell;

calculating a sealing valve estimated temperature that is an estimated temperature of the sealing valve by subtracting a correction value from the fuel cell temperature after the fuel cell stops generating the power and after the sealing valve is closed; and determining whether at least one of the valve temperature and the sealing valve estimated temperature is lower than a predicted freezing temperature; and opening the sealing valve when it is determined that the at least one of the valve temperature and the sealing valve estimated temperature is lower than the predicted freezing temperature.

8. The method of controlling the fuel cell system according to claim 7, further comprising:

calculating a difference value by subtracting the valve temperature from the fuel cell temperature before the fuel cell stops generating the power;

determining whether the difference value is larger than an abnormality determination threshold;

calculating the sealing valve estimated temperature after the fuel cell stops generating the power and after the sealing valve is closed, when it is determined that the difference value is larger than the abnormality determination threshold;

determining whether the at least one of the valve temperature and the sealing valve estimated temperature is lower than the predicted freezing temperature, when it is determined that the difference value is larger than the abnormality determination threshold; and determining whether the valve temperature is lower than the predicted freezing temperature after the fuel cell stops generating the power and after the sealing valve is closed, when it is determined that the difference value is not larger than the abnormality determination threshold.

9. The method of controlling the fuel cell system according to claim 7, further comprising:

determining whether or not the temperature of the sealing valve and the temperature of the fuel cell are correlated with each other upon receipt of a system stop signal;

controlling the fuel cell to stop generating the power and to close the sealing valve to monitor at least one of the valve temperature and the sealing valve estimated temperature when it is determined that the temperature of the sealing valve and the temperature of the fuel cell are correlated with each other; and controlling the fuel cell to continue generating the power when it is determined that the temperature of the sealing valve and the temperature of the fuel cell are not correlated with each other.

10. The method of controlling the fuel cell system according to claim 7, further comprising driving an air pump when the sealing valve is opened when it is determined that the at least one of the valve temperature and the sealing valve estimated temperature is lower than the predicted freezing temperature.

11. The method of controlling the fuel cell system according to claim 7, wherein the refrigerant circulation circuit supplies the refrigerant discharged from the fuel cell to the sealing valve, and wherein the heat of the fuel cell is supplied to the sealing valve through the refrigerant.

\* \* \* \* \*